US012253440B2

(12) United States Patent
Soliman et al.

(10) Patent No.: US 12,253,440 B2
(45) Date of Patent: Mar. 18, 2025

(54) METHODS AND SYSTEMS FOR AUTOMATIC MULTI-PHASE MOBILE SAMPLING COLLECTION AND ANALYSIS

(71) Applicant: Saudi Arabian Oil Company, Dhahran (SA)

(72) Inventors: Mohamed Ahmed Soliman, Ras Tanura (SA); Nisar Ahmad Ansari, Ras Tanura (SA); Ahmed Al-Khaldi, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 916 days.

(21) Appl. No.: 17/365,110

(22) Filed: Jul. 1, 2021

(65) Prior Publication Data

US 2023/0003620 A1 Jan. 5, 2023

(51) Int. Cl.
*G01N 1/14* (2006.01)
*G01N 1/20* (2006.01)

(52) U.S. Cl.
CPC ............. *G01N 1/14* (2013.01); *G01N 1/2035* (2013.01); *G01N 2001/1436* (2013.01); *G01N 2001/2057* (2013.01)

(58) Field of Classification Search
CPC .................. G01N 1/14; G01N 1/2035; G01N 2001/1436; G01N 2001/2057; G01N 1/10; G01N 2001/1093; G01N 2001/1445
USPC ........................................................ 73/863.83
See application file for complete search history.

(56) References Cited

U.S. PATENT DOCUMENTS

| 4,494,413 A | 1/1985 | Bukkems et al. |
| 4,872,316 A | 10/1989 | Browne et al. |
| 5,501,080 A | 3/1996 | McManus et al. |
| 6,435,279 B1 * | 8/2002 | Howe .................. E21B 49/086 |
| | | 166/336 |
| 7,866,222 B2 | 1/2011 | Moore et al. |

(Continued)

FOREIGN PATENT DOCUMENTS

| CN | 103257058 A | 8/2013 |
| CN | 105806660 A * | 7/2016 |

(Continued)

OTHER PUBLICATIONS

1st Examination Report for Saudi Arabian Application No. 122431094 (and a non-certified translation) dated Mar. 7, 2024.

(Continued)

*Primary Examiner* — Daniel S Larkin
*Assistant Examiner* — Nashmiya S Fayyaz
(74) *Attorney, Agent, or Firm* — Bracewell LLP; Constance G. Rhebergen; Keith R. Derrington

(57) ABSTRACT

A fluid sampling device including an inlet configured to receive a portion of a non-homogeneous fluid flowing through a conduit, a first double block bleed valve coupled to the inlet, a first flexible hose coupled to the first double block bleed valve by a first quick acting and leakage free coupling, a collection drum coupled to the first flexible hose by a first control valve, and a container coupled to the connection drum by a manual valve, wherein the device is configured to collect a fluid sample in the container. The device also includes a pressure controller to control pressure within the collection drum, and a level indicator to indicate a level of fluid in the collection drum.

29 Claims, 12 Drawing Sheets

(56) References Cited

U.S. PATENT DOCUMENTS

| | | | |
|---|---|---|---|
| 8,434,372 | B2 | 5/2013 | Fjerdingstad |
| 9,097,695 | B2 | 8/2015 | Kriel et al. |
| 9,846,109 | B2 | 12/2017 | Hall et al. |
| 2012/0067434 | A1* | 3/2012 | Foo .................. B67D 9/00 137/15.01 |
| 2017/0030809 | A1 | 2/2017 | Knight |
| 2020/0209212 | A1 | 7/2020 | Garcia et al. |

FOREIGN PATENT DOCUMENTS

| | | | | |
|---|---|---|---|---|
| CN | 108267478 | A | | 8/2018 |
| CN | 108375660 | A | | 8/2018 |
| CN | 207850967 | U | | 9/2018 |
| CN | 208847527 | U | * | 5/2019 |
| CN | 111579316 | A | | 8/2020 |
| FR | 2935488 | A1 | | 3/2010 |
| GB | 2520709 | A | * | 6/2015 ............. E21B 34/00 |
| GB | 2562993 | A | | 12/2018 |

OTHER PUBLICATIONS

"Field Testing" available as of Mar. 26, 2021 at: https://ww2.arb.ca.gov/sites/default/files/classic/research/apr/past/arb-5-1323b-vol.2-app.pdf; pp. 1-138.

ASTM International; "Standard Practice for Manual Sampling of Petroleum and Petroleum Products" Designation: D4057-12, Manual of Petroleum Measurement Standards (MPMS), Chapter 8.1, 2017; pp. 1-49.

Daisey, Joan M.; "Real-Time Portable Organic Vapor Sampling Systems: Status and Needs" Indoor Environment Program Applied Science Division, University of California, Berkley, CA; Mar. 1987; pp. 1-16.

Mechatest; "Gas & Liquefied Gas Sampling Solutions" available as of Mar. 26, 2021 at: https://www.mechatest.com/products/gas-sampling-system/; pp. 1-6.

Palonen, V. et al.; "A portable methane sampling system for radiocarbon-based bioportion measurements and environmental CH4 sourcing studies" (abstract only) Review of Scientific Instruments 88, Jul. 24, 2017; pp. 1-5.

Petrotec; "Pumps & Compressors" available as of Mar. 26, 2021 at: http://www.petrotec.com.qa/pumbs-compressors.html; pp. 1-2.

Saudi Aramco; "Best Practice: SA BP-A-109, Sampling Point Designs" Document Responsibility: Oil and Gas Process Engineering Standards Committee, Jan. 20, 2020; pp. 1-39.

Saudi Aramco; "Engineering Encyclopedia: Crude Oil Desalting" Saudi Aramco Desk Top Standards, undated; pp. 1-93.

Saudi Aramco; "Engineering Standard: SAED-A-010, Gas Oil Separation Plants (COSPs)" Document Responsibility: Oil and Gas Process Engineering Standards Committee, Sep. 21, 2020; pp. 1-55.

* cited by examiner

METHODS AND SYSTEMS FOR AUTOMATIC MULTI-PHASE MOBILE SAMPLING COLLECTION AND ANALYSIS

TECHNICAL FIELD

This specification generally relates to systems, devices, and methods for acquiring a fluid sample.

BACKGROUND

For various reasons it may be necessary to take representative samples of non-homogeneous fluids in order to determine the concentration of the components in the fluids. The sampling of a fluid is normally combined with the transport of the fluid through a pipeline, being one of the most important transporting means in many industries handling large quantities of fluids.

One example where the sampling of fluids has become increasingly important in the recent years is found in the oil industry. Sampling of crude oil for determining the net amount of oil has to be performed very accurately in connection with the metering of crude oil for royalty purposes. The knowledge of the correct amount of hydrocarbons in the available crude oil will further enable refinery operation management to draw up more accurate mass balances, so that the various refinery operations may be carried out in the most efficient manner.

A large variety of methods are known for sampling fluids; however, all these methods suffer from being not accurate enough when non-homogeneous fluids are to be sampled. The main reason for this inaccuracy consists herein that the samples which are taken from a fluid stream in a pipeline in the known methods are not representative for the bulk of fluid but only for that part of the fluid passing the sample point at the moment the samples are taken.

A problem in sampling crude oil to determine the content of water and bottom sediments in the oil, is formed by the fact that the water and other contaminations are hardly ever uniformly distributed in the oil. When crude oil is stored in a tank, the water and bottom sediments will settle down in the bottom part of the tank. When, for example, crude oil is unloaded from a tanker and transferred through a pipeline the amount of water and bottom sediments in the crude oil will exhibit large fluctuations. When the unloading of a tank in the tanker is in an advanced stage the crude oil passing through the pipeline will contain no or only small amounts of water dispersed therein. However, when the unloading of a further tank is started the amount of water in the crude oil will suddenly increase, and even slugs of water ray pass through the pipeline. Samples taken from the first part of the crude oil unloaded from a tanker may therefore totally differ from samples taken from the crude oil during the last part of the unloading. None of these samples nor the combined samples will necessarily be representative for the total mass of crude oil unloaded from the tanker. Further large variations in throughput may occur during the unloading process, causing further inaccuracies in the known sampling methods.

SUMMARY

Fluid sampling devices are used in many industries to acquire a measured volume of fluid from an independent fluid source for transport to a remote testing location. Testing of the fluid sample may include detecting the presence of contaminants and/or determining the fluid's physical properties and composition. Generally, the fluid from the fluid source is circulated through the fluid sampling device, which facilitates the capture of a representative sample in a sample vessel that is detachable from the sampling device.

This specification describes technologies related to systems, apparatus, and methods for acquiring a fluid sample, and a sampling system that is mobile and can be taken from field to field, e.g. the entire system is contained within a truck or other mobile unit.

Embodiments relate to an automated portable sampling apparatus and system to collect representative samples from non-homogeneous hydrocarbon systems and pipelines with no release of toxic vapor and liquid waste containing hydrogen sulfide to atmosphere. The example system is capable of conducting all mandatory sampling analysis automatically onsite without taking samples to the laboratory. The mobile sampling system can be placed on trolley or on truck.

One objective is to minimize the risk of personnel exposure to toxic hydrogen sulfide during sampling. Another objective is to collect representative sample mixture and ensure adequate phase mixing before collecting the samples. Another objective is to conduct all necessary sampling analysis onsite on fresh crude emulsion sample. Another objective is to minimize the incidents occurs as a result of taking samples from unsafe drains and vents. Yet another objective is to provide automatic portable sampling station to collect representative sample instead of the unsafe sampling practices from drains or vents.

Another objective is to provide automatic online monitoring of the crude specifications and wells performance. Another objective is to minimize waste, capital expenditure, and operating cost for collecting and analyzing samples in the designated laboratory locations.

The embodiments disclosed enable building a sample vehicle equipped with all necessary sampling analysis requirement to conduct routine field analysis and avoid sending samples to the laboratories if not necessary. Sampling can be automated and all toxic vapors is recovered and injected back to the production line.

One embodiment is a portable sampling apparatus and a system to collect representative sample from hydrocarbon systems and pipelines. The system can conduct all mandatory sampling analysis automatically onsite without taking samples to the laboratory. A fluid sampling device including an inlet configured to receive a portion of a non-homogeneous fluid flowing through a conduit, a first double block bleed valve coupled to the inlet, a first flexible hose coupled to the first double block bleed valve by a first quick acting and leakage free coupling, a collection drum coupled to the first flexible hose by a first control valve, and a container coupled to the connection drum by a manual valve, wherein the device is configured to collect a fluid sample in the container. The device also includes a pressure controller to control pressure within the collection drum, and a level indicator to indicate a level of fluid in the collection drum. The device also includes a battery operated positive displacement compressor coupled to the collection drum, a second flexible hose coupled to the compressor by a non-return valve, and a second double block bleed valve coupled to the conduit, wherein the second flexile hose is coupled to the second double block bleed valve by a second quick acting and leakage free coupling. The device also includes a pressure differential valve coupled to the conduit, a first pressure transducer configured to measure pressure of the fluid before entering the pressure differential valve, and a second pressure transducer configured to measure pressure of the fluid after exiting the pressure differential valve.

Another example embodiment is a method for sampling a fluid. The method includes providing an inlet to receive a portion of a non-homogeneous fluid flowing through a conduit, coupling a first double block bleed valve to the inlet, coupling a first flexible hose to the first double block bleed valve by a first quick acting and leakage free coupling, coupling a collection drum to the first flexible hose by a first control valve, coupling a container to the connection drum by a manual valve, and collecting a fluid sample in the container. The method may also include providing a pressure controller to control pressure within the collection drum, and providing a level indicator to indicate a level of fluid in the collection drum. The method may also include coupling a battery operated positive displacement compressor or booster pump to the collection drum, coupling a second flexible hose to the compressor by a non-return valve, and coupling a second double block bleed valve to the conduit, wherein the second flexile hose is coupled to the second double block bleed valve by a second quick acting and leakage free coupling. The method may also include coupling a pressure differential valve to the conduit, providing a first pressure transducer configured to measure pressure of the fluid before entering the pressure differential valve, and providing a second pressure transducer configured to measure pressure of the fluid after exiting the pressure differential valve. The non-homogeneous fluid may include a three-phase stream including water, oil, and gas. The fluid may also include toxic materials or hazardous products, and the method is configured to eliminate release of toxic waste into the atmosphere. The battery operated positive displacement compressor may be configured to return waste back to the fluid stream after sampling. The method may also include analyzing the fluid sample collected, and the analysis may include at least one of water cut measurement, viscosity measurement, density measurement, salt measurement, and assessing the composition of the fluid sample collected. The method may further include coupling a control unit to all the valves and the compressor, the control unit configured to control collection of the fluid sample in the container. The method may also include coupling a nitrogen tank to the first double block bleed valve by a control valve. The method may further include coupling at least one of a temperature sensor, a pressure sensor, a density meter, a water cut meter, a viscosity meter, and a salt analyzer, to the control unit. The method may also include coupling a liquid pump and ejector to the collection drum, the liquid pump and ejector configured to pump the fluid back to the conduit.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION

The methods and systems of the present disclosure can now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure can be thorough and complete, and can fully convey its scope to those skilled in the art. Like numbers refer to like elements throughout.

The present disclosure relates to systems, devices, and methods for acquiring a representative fluid sample from a fluid source. In some embodiments, a fluid sampling device is appropriately configured to facilitate the acquisition of a fluid sample and the subsequent purging of its internal components, while inhibiting the release of sample fluid to the surrounding environment. This protects the environment and sampling personnel from harmful chemical release. In some examples, the fluid sampling device may facilitate a sample acquisition process that provides closed-loop flush and expansion operations for obtaining a representative sample at the appropriate fill density of the sample vessel. In some examples, the fluid sampling device may facilitate an inert-gas purging process that deposits residual sample fluid from previous sampling operations directly back into the fluid source. In some embodiments, a fluid sampling device includes an internal booster pump operable to maintain the pressure of the sample fluid above its vapor pressure to inhibit inadvertent flashing of a two-phase sample fluid to a gas phase. Thus, the fluid sampling device can facilitate sample acquisition from an external fluid source without an independent pressure source (e.g., a tank or reservoir). In order to be mobile, the fluid sampling device is preferably contained within a truck or other mobile unit that can travel from well to well and from field to field.

Figure 1:
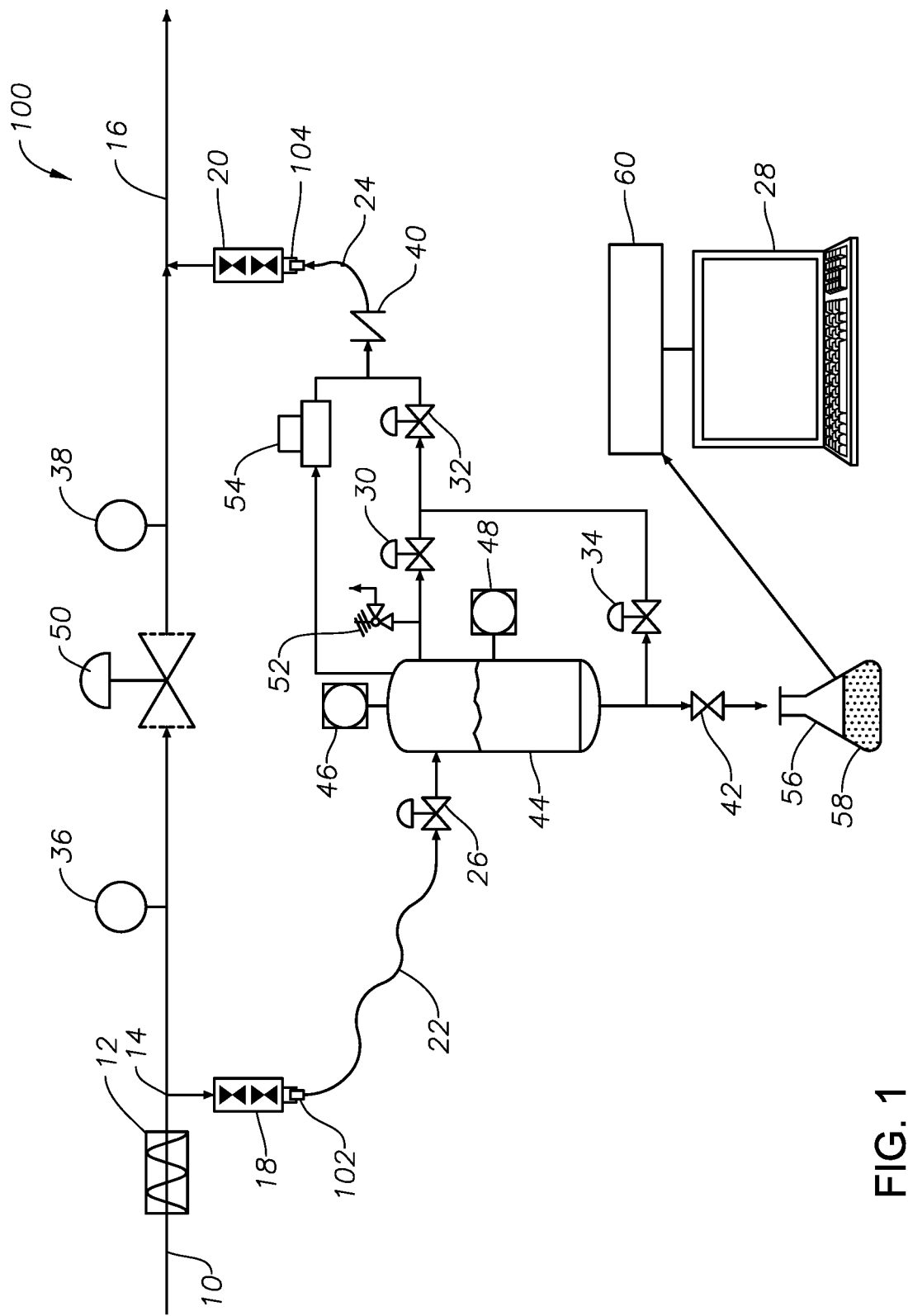
FIG. 1 illustrates a fluid sampling device and a fluid sampling method, according to one example embodiment of the disclosure.

Turning now to the figures, FIG. 1 illustrates a fluid sampling device 100 and a fluid sampling method, according to one example embodiment of the disclosure. Device 100 is a battery operated portable sampling station using a positive displacement compressor 54. The process involves collecting the crude sample 58 from three phase flow upstream choke valve or upstream any control valves or restriction orifice 50 inside a gas oil facility. The system includes piping 10 that contains a three phase fluid, e.g. including water, gas, and oil, flowing through it at a gas oil facility. A static mixer 12 mixes the fluids together, and the pipe 10 has an input 14 and an output 16. A flexible hose 22 is connected upstream the choke or control valve 50 and a discharge hose 24 is connected downstream the choke or control valve 50 via quick acting and leakage free couplings 102, 104 on one side and a non-return valve (NRV) 40 on the other side.

The method includes ensuring that pressure differential valve (PDV) 50 is open and there is differential pressure across the valve by comparing the reading from pressure transmitter PI-1 36 and pressure transmitter PI-2 38. The next step is to connect the portable sampling device at double block and bleed valves (DBBV1 & DBBV2) 18, 20 using the provided quick acting and leakage free couplings 102, 104, respectively. The next step is to open valves 18, 20, and open control valves 26, 34, 32 for three minutes to clean the piping and to clean and remove any fluids inside the sampling station for better sampling collection. The next step is to ensure the level inside the Collection Drum (CD) 44 is zero. The next step is to open control valve 30 for an additional minute to ensure the vapor line is clean. The sample collection step involves closing valve 34 and opening valve 30 and monitoring the liquid level indicator (LC) 48 inside the collection drum 44, and when LC 48 reaches 100%, closing valves 18 and 32, to start the battery-operated positive displacement compressor (BOPDC) 54. The next step is to monitor pressure controller (PC) 46 on the collection drum 44 and stop the compressor 54 when pressure reaches 0 psig. The next step is to close valve 20 which will ensure the full isolation of the sampling skid from the crude pipeline. The next step is to open the manual valve (MV) 42 and collect the crude sample 58 inside the sample container 56. The next step is to disconnect the portable sampling station 100 from valves 18 and 20 using the provided quick acting and leakage free couplings 102, 104, respectively. After the fluid sample 58 is collected in the sample container 56, the fluid sample 58 may be analyzed using a computer software program (fluid analyzer) 60, which may be installed on a network computer 28.

Figure 2:
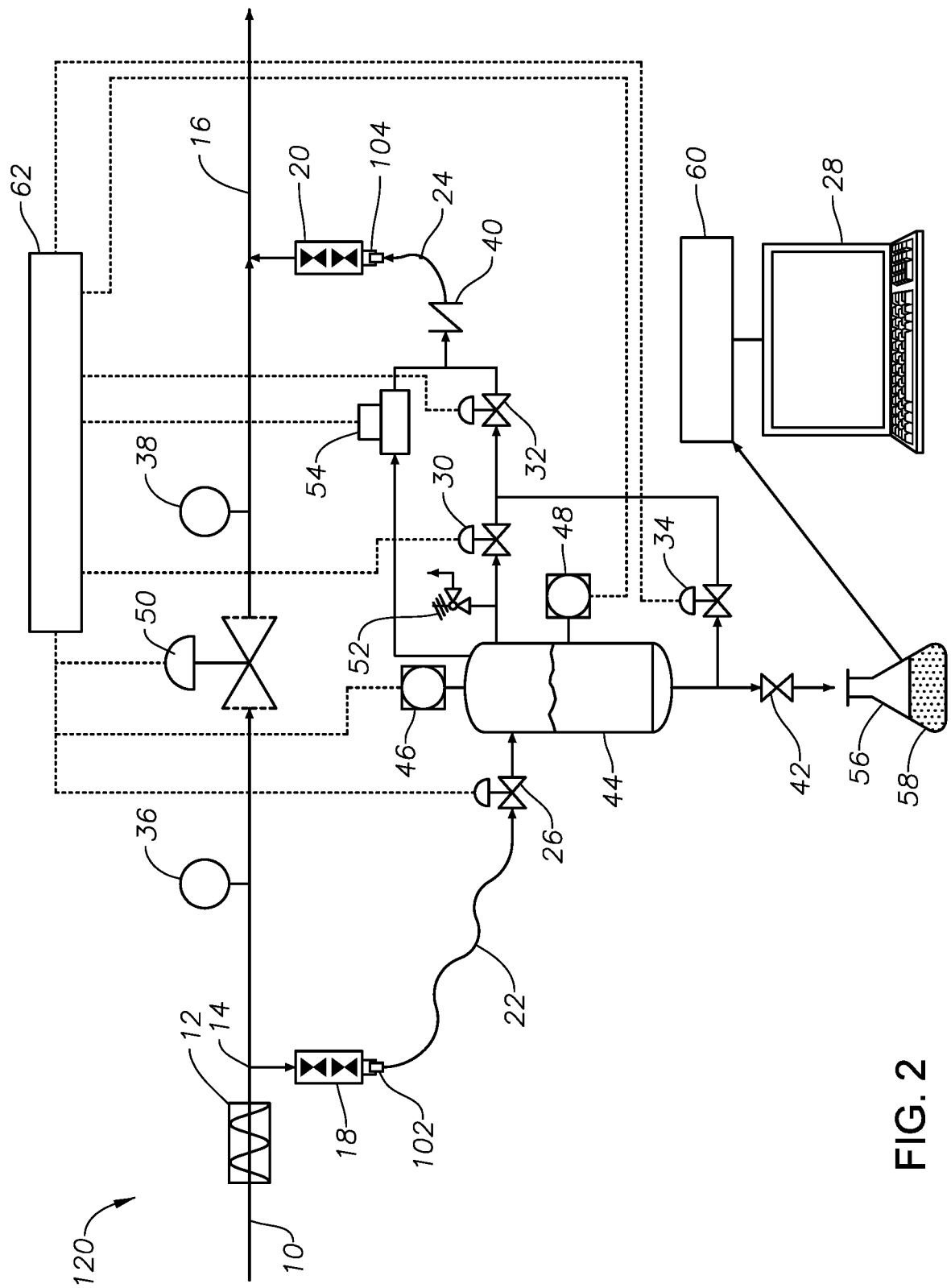
FIG. 2 illustrates a fluid sampling device and a fluid sampling method, according to another example embodiment of the disclosure.

FIG. 2 illustrates a fluid sampling device 120 and a fluid sampling method, according to another example embodiment of the disclosure. Device 120 includes an advanced process control unit 62, which is utilized to automate the sampling collection process to minimize human interaction and exposure to toxic gases during the sampling process. The automatic sampling process starts after the manual connection of the hoses 22, 24 via quick acting and leakage free couplings 102, 104 and the opening of valves 18, 20.

Figure 3:
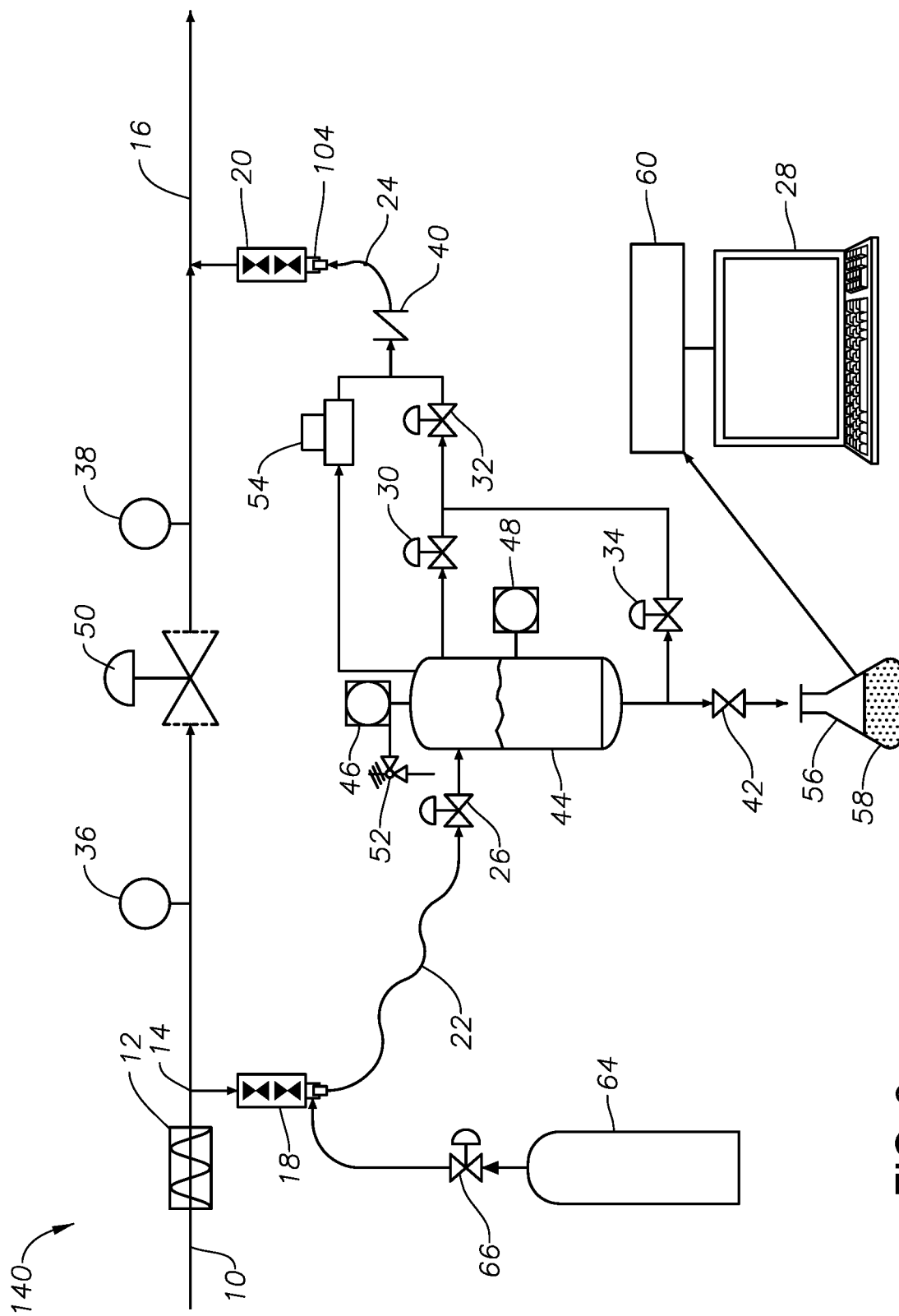
FIG. 3 illustrates a fluid sampling device and a fluid sampling method, according to another example embodiment of the disclosure.

FIG. 3 illustrates a fluid sampling device 140 and a fluid sampling method, according to another example embodiment of the disclosure. Device 140 has an enhanced battery-operated portable sampling station using compressors and nitrogen. In this configuration, nitrogen is used to sweep the sampling system before and after sampling.

The method includes ensuring the positive displacement valve 50 is open and there is differential pressure across the valve by comparing the reading from the pressure transmitter PI-1 36 and PI-2 38. The next step is to connect the portable sampling device at double block and bleed valves 18, 20 using quick acting and leakage free couplings 102, 104. The next step is to open valves 18, 20, and open control valves 26, 34, 32 for three minutes to clean the piping and to clean and remove any fluids inside the sampling station for better sampling collection. The next step is to ensure the level inside the Collection Drum (CD) 44 is zero. The next step is to open control valve 30 for additional minute to ensure the vapor line is clean. The sample collection step involves closing control valves 34 and 30, monitoring the liquid level indicator LC 48 inside the collection drum 44, and when LC 48 reaches 100%, closing valves 18 and 32.

The compressor 54 operation includes monitoring the pressure controller PC 46 on the collection drum 44 and stopping the compressor 54 when pressure reaches 0 psig. The next step is to open control valve 66 and fill in the sampling station until a pressure of 10 psig. The next step is to run the compressor 54 until PC 46 reaches zero psig. The next step is to refill the sampling station with nitrogen using tank 64 until pressure PC 46 reaches 10 psig. The next step is to run the compressor 54 until PC 46 reaches zero psig, and closing control valve 66.

The next step in the process is to start the Battery-Operated Positive Displacement Compressor 54. The next step is to monitor the pressure controller 46 on the collection drum 44 and stop the compressor 54 when pressure reaches 0 psig. The next step is to close valve 18 which will ensure the full isolation of the sampling skid from the crude pipeline. The next step is to open the manual valve MV 42 and collect the crude sample 58 inside the sample container 56. The next step is to disconnect the portable sampling station from valves 18, 20 using the quick acting and leakage free couplings 102, 104.

Figure 4:
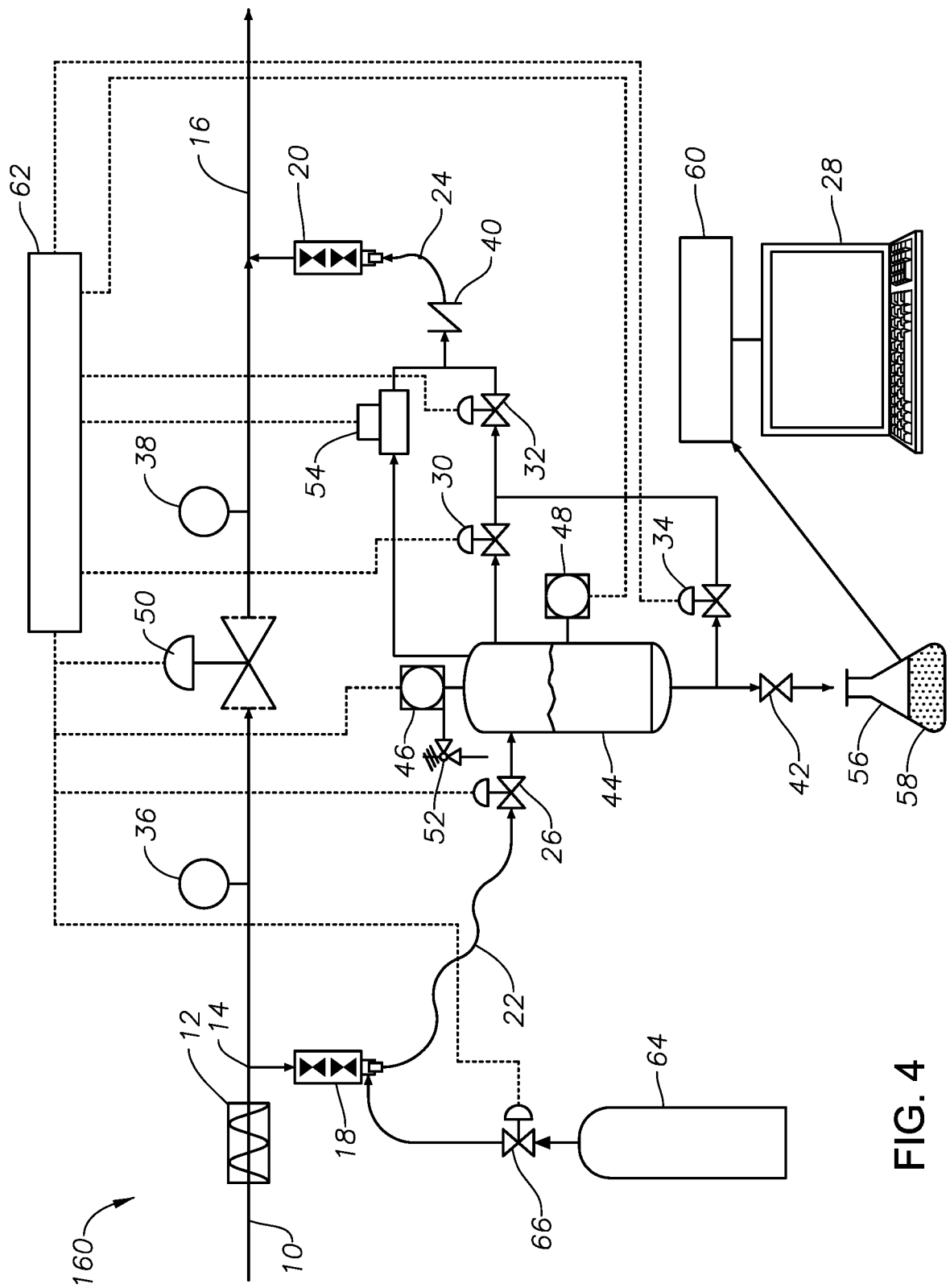
FIG. 4 illustrates a fluid sampling device and a fluid sampling method, according to another example embodiment of the disclosure.

FIG. 4 illustrates a fluid sampling device 160 and a fluid sampling method, according to another example embodiment of the disclosure. In the embodiment, an advanced process control 62 is utilized to automate the sampling collection and analysis to minimize human interaction and exposure to toxic gases during the sampling process. The automatic sampling process will start after the manual connection of the hoses via quick acting and leakage free couplings 102, 104 and the opening of valves 18, 20.

Figure 5:
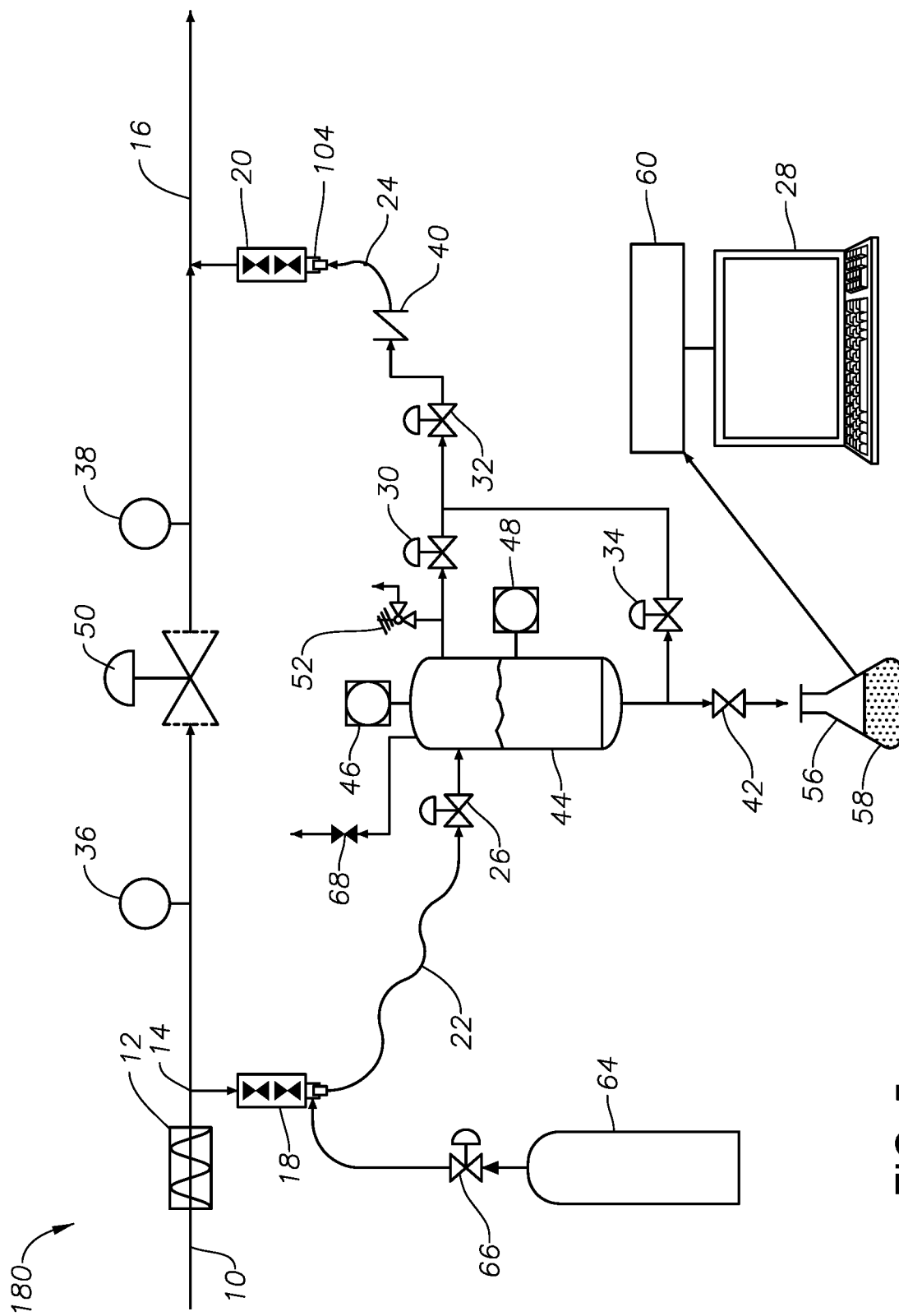
FIG. 5 illustrates a fluid sampling device and a fluid sampling method, according to another example embodiment of the disclosure.

FIG. 5 illustrates a fluid sampling device 180 and a fluid sampling method, according to another example embodiment of the disclosure. Device 180 includes a mobile sampling station using only nitrogen and no compressors. In this configuration, nitrogen is used to sweep the sampling system before and after sampling. No battery operated gas compressors are used.

The method involves ensuring the pressure Differential Valve PDV 50 is open and there is differential pressure across the valve by comparing the reading from the pressure transmitter PI-1 36 and PI-2 38. The next step is to connect the mobile sampling device at Double Block and Bleed Valves 18, 20 using the quick acting and leakage free couplings 102, 104. The next step is to open valves 18, 20, and open 26, 32, 34 for three minutes to clean the piping and to clean and remove any fluids inside the sampling station for better sampling collection. The next step is to ensure the level inside the Collection Drum (CD) 44 is 0. The next step is to open control valve 30 for an additional minute to ensure the vapor line is clean. The sample collection step involves closing valve 34 and opening valve 30 and monitoring the liquid level indicator LC 48 inside the collection drum 44, and when LC 48 reaches 100%, closing 18, to start nitrogen pressurization and sweeping. The next step is to close valve 32, open valve 66 and pressurize the sampling station to above the PI-2 38 pressure by 10 psigs. The next step is to open valve 32 gradually and run nitrogen sweeping for one minute. The next step is to close valve 32 and pressurize the sampling station to above the PI-2 38 pressure by 10 psigs. The next step is to open valve 32 gradually and run nitrogen sweeping for one minute, and close valve 66. The next step is to close valve 18, which will ensure the full isolation of the sampling skid from the crude pipeline. The next step is to open the vent valve VV1 68 gradually to the atmosphere to depressurize the system and release the nitrogen. The next step is to open the manual valve MV 42 and collect the crude sample 58 inside the sample container 56. The next step is to disconnect the portable sampling station from valves 18, 20 using the quick acting and leakage free couplings 102, 104.

Figure 6:
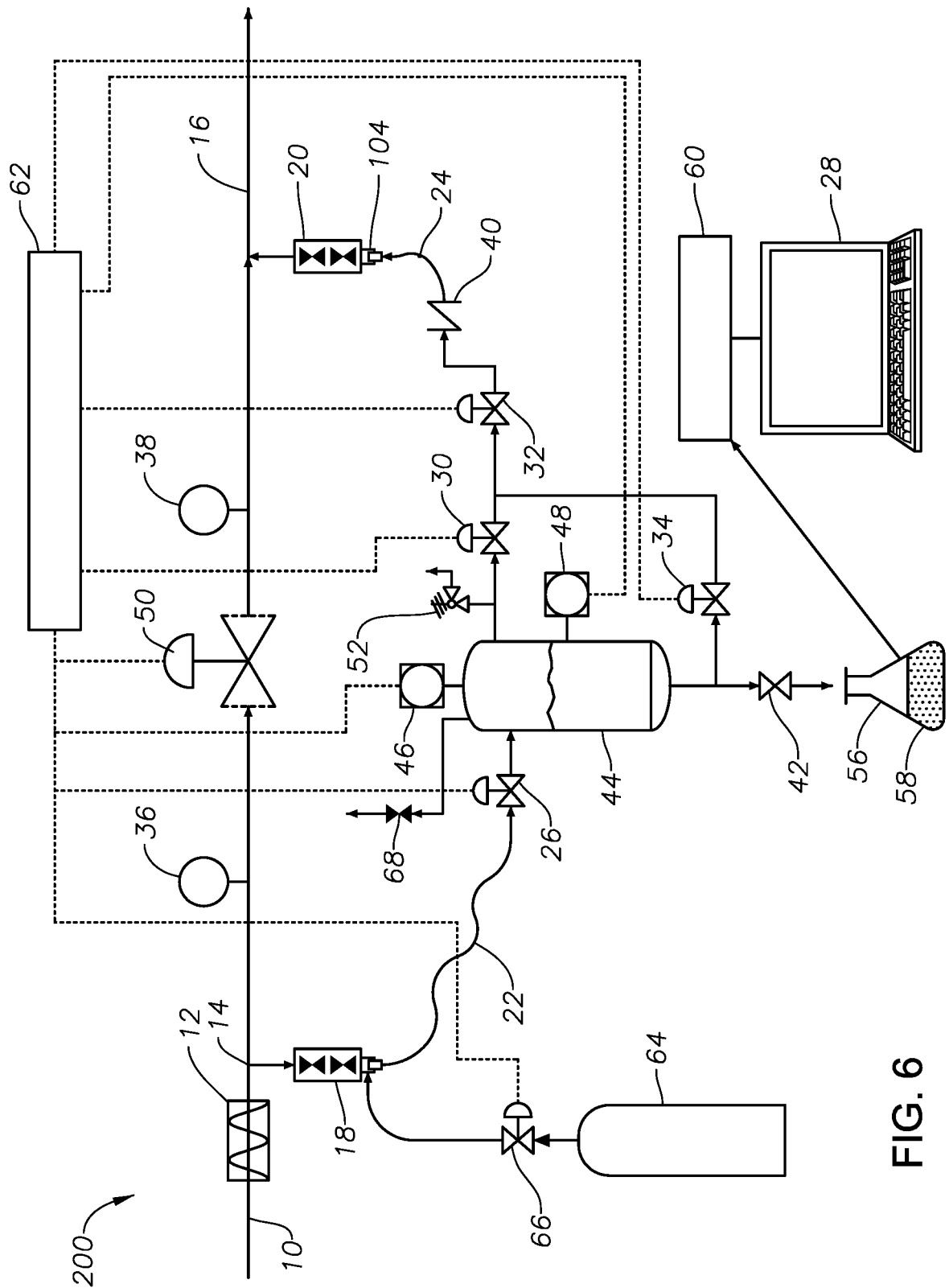
FIG. 6 illustrates a fluid sampling device and a fluid sampling method, according to another example embodiment of the disclosure.

FIG. 6 illustrates a fluid sampling device 200 and a fluid sampling method, according to another example embodiment of the disclosure. In this embodiment, an advanced process control unit 62 is utilized to automate the sampling collection and analysis to minimize human interaction and exposure to toxic gases during the sampling process. The automatic sampling process will start after the manual connection of the hoses 22, 24 via quick acting and leakage free couplings 102, 104 and the opening of valves 18, 20.

Figure 7:
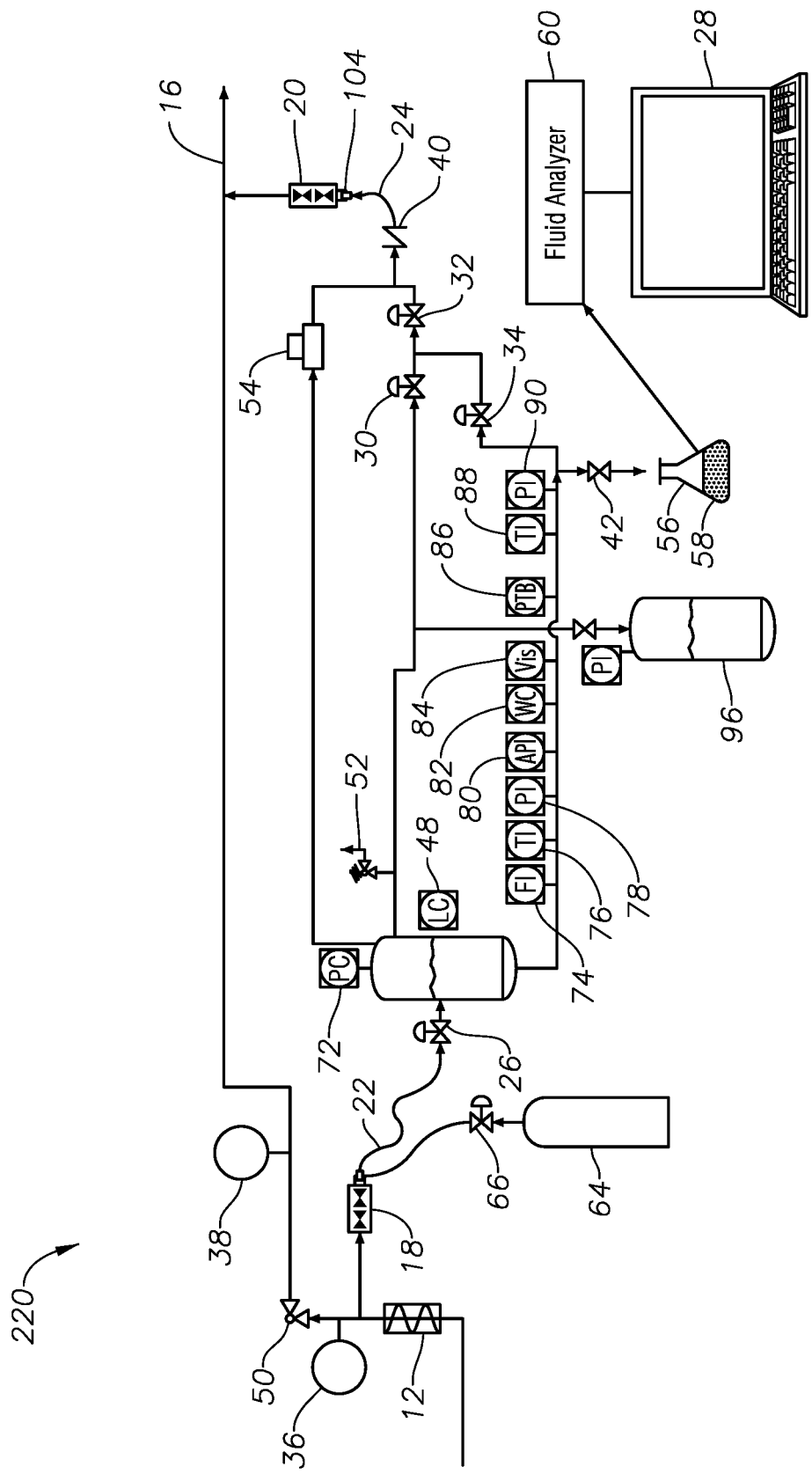
FIG. 7 illustrates a fluid sampling device and a fluid sampling method, according to another example embodiment of the disclosure.

FIG. 7 illustrates a fluid sampling device 220 and a fluid sampling method, according to another example embodiment of the disclosure. Device 220 includes a mobile sampling station with online measurement using nitrogen 64 and a battery operated compressor 54. This embodiment brings the laboratory to the site by conducting the proper sample collection and conducting all sample analysis online. Additionally, this embodiment provides the means to collect atmospheric fluid samples and pressurized gas samples. A plurality of instruments are installed on the sampling loop, including but not limited to the following: Water cut (WC) 82, Density Meter 80, Viscosity Meter 84, Temperature sensors 76, 88, Pressure sensors 78, 90, Flow rate sensor 74, and Salt Content sensor 86.

Figure 8:
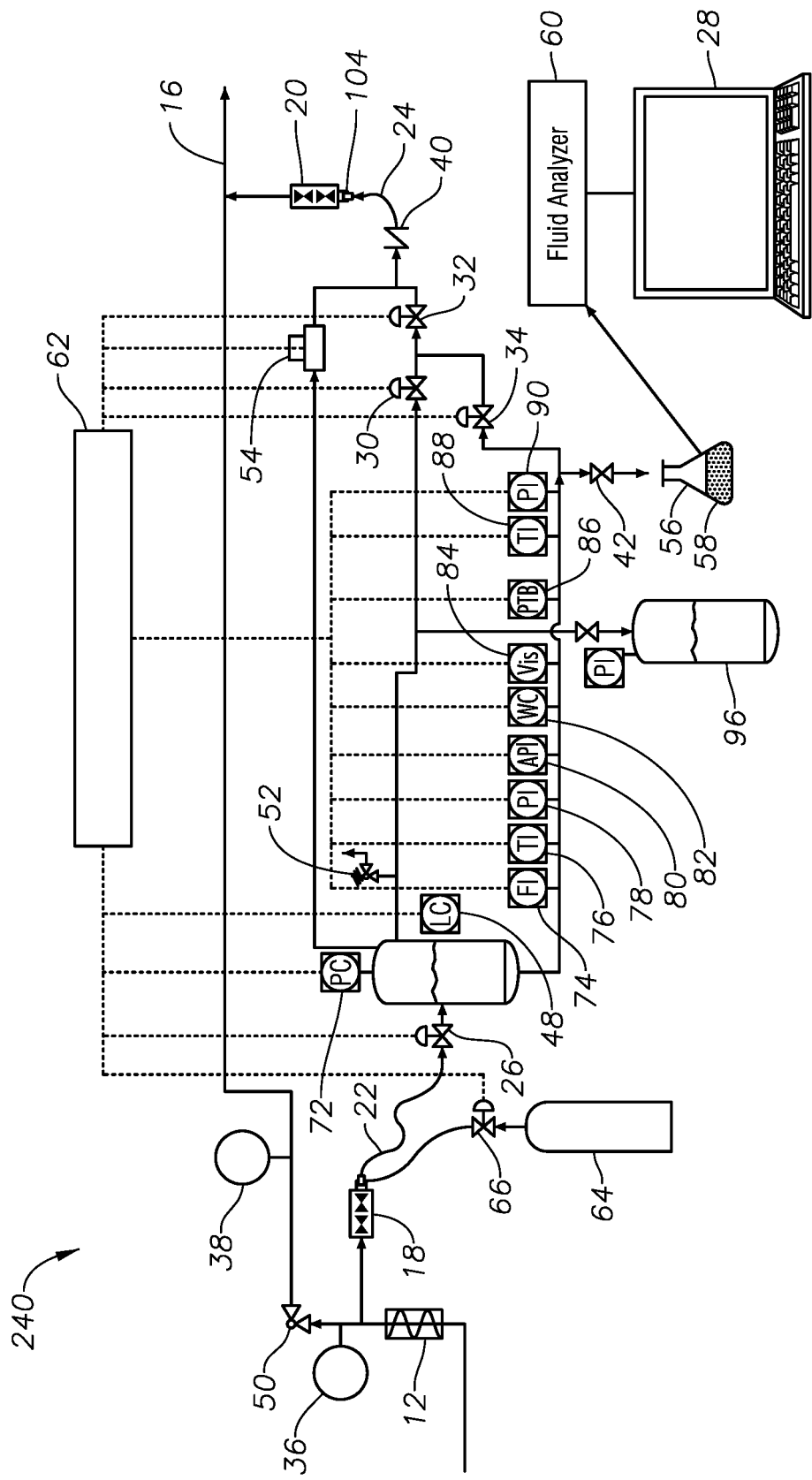
FIG. 8 illustrates a fluid sampling device and a fluid sampling method, according to another example embodiment of the disclosure.

FIG. 8 illustrates a fluid sampling device 240 and a fluid sampling method, according to another example embodiment of the disclosure. In this embodiment, an advanced process control unit 62 is utilized to automate the sampling collection and analysis to minimize human interaction and exposure to toxic gases during the sampling process. The automatic sampling process will start after the manual connection of the hoses 22, 24 via quick acting and leakage free couplings 18, 20 and the opening of valves 102, 104. Additionally, this embodiment provides the means to collect atmospheric fluid sample and pressurized gas samples.

Figure 9:
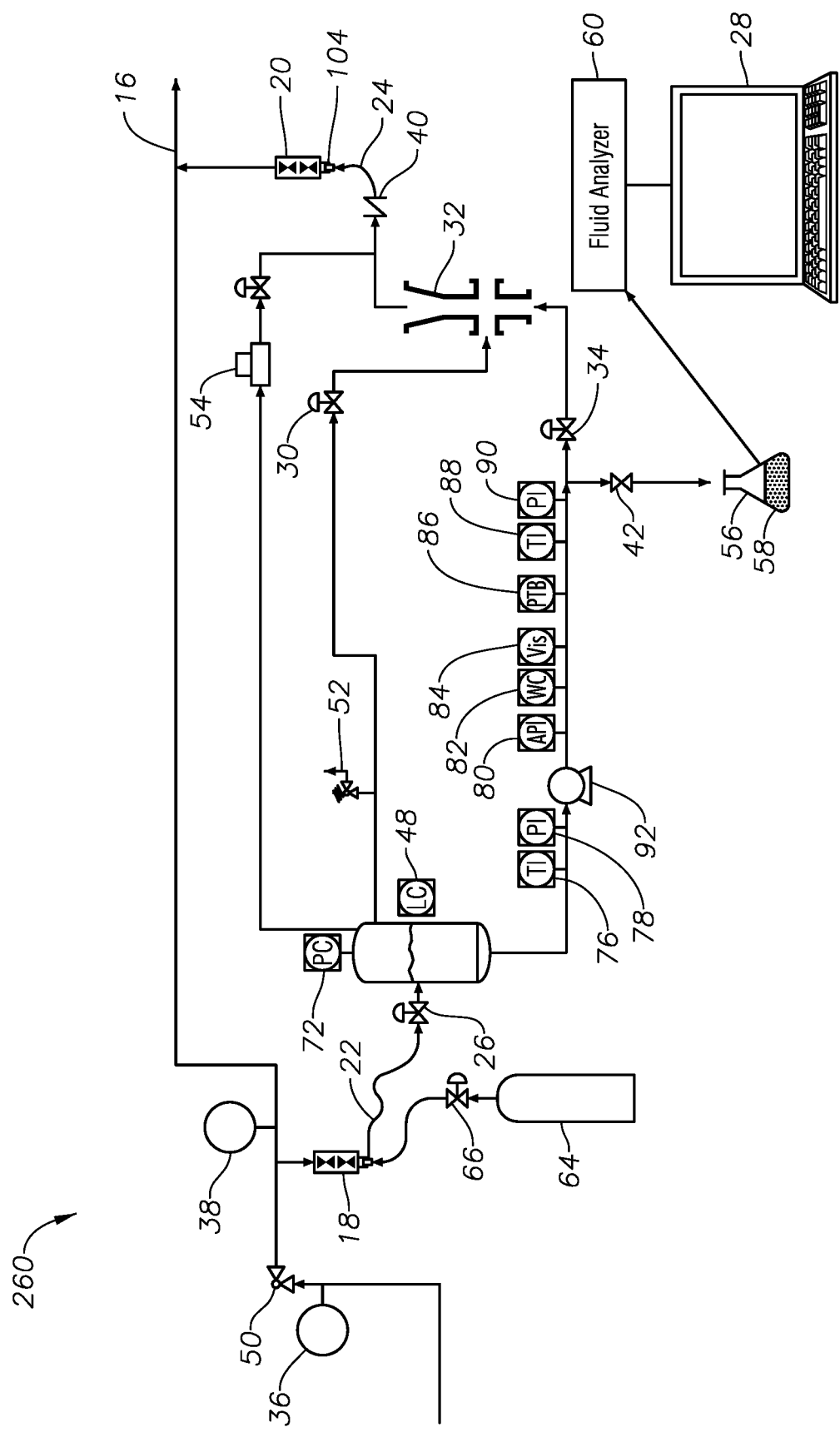
FIG. 9 illustrates a fluid sampling device and a fluid sampling method, according to another example embodiment of the disclosure.

FIG. 9 illustrates a fluid sampling device 260 and a fluid sampling method, according to another example embodiment of the disclosure. Device 260 includes a mobile sampling station with online measurement using nitrogen 64 and battery operated compressor 54 and a liquid pump and ejector 92. The objective of this configuration is to collect and analyze the sample downstream the choke valve 50. Choke valve 50 with high differential pressure will provide adequate mixing for the fluid and therefore representative sample. The only problem is the return of the gas and waste to the main line. The liquid pump and ejector 92 is utilized to pump fluid back to the line. The liquid pump and ejector 92 utilizes the pumped fluid to increase the pressure of the gas and then return it to the main line.

Figure 10:
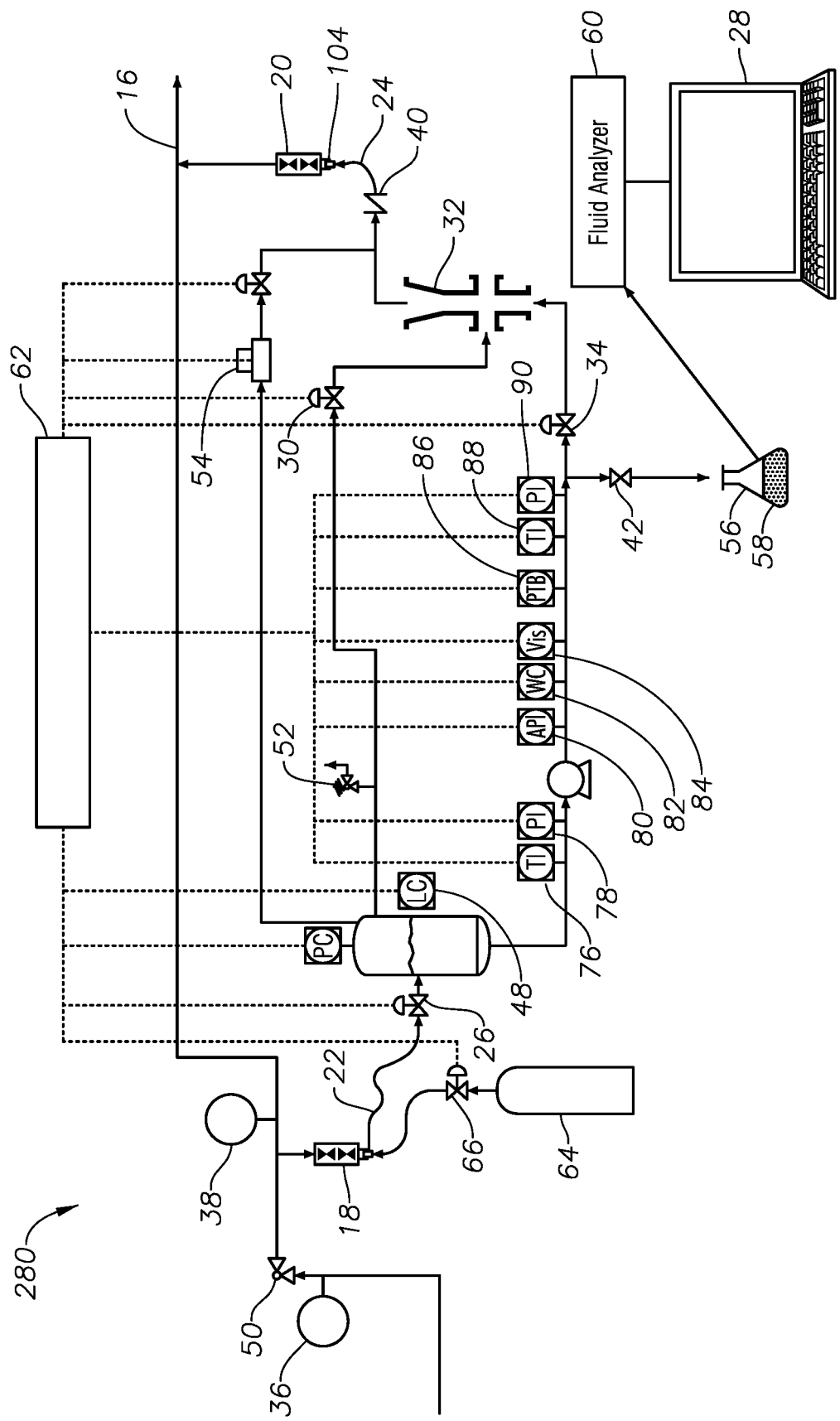
FIG. 10 illustrates a fluid sampling device and a fluid sampling method, according to another example embodiment of the disclosure.

FIG. 10 illustrates a fluid sampling device 280 and a fluid sampling method, according to another example embodiment of the disclosure. In this embodiment, an advanced process control unit 62 is utilized to automate the sampling collection and analysis to minimize human interaction and exposure to toxic gases during the sampling process. The automatic sampling process will start after the manual connection of the hoses 18, 20 via quick acting and leakage free couplings 102, 104 and the opening of valves 18, 20.

Figure 11:
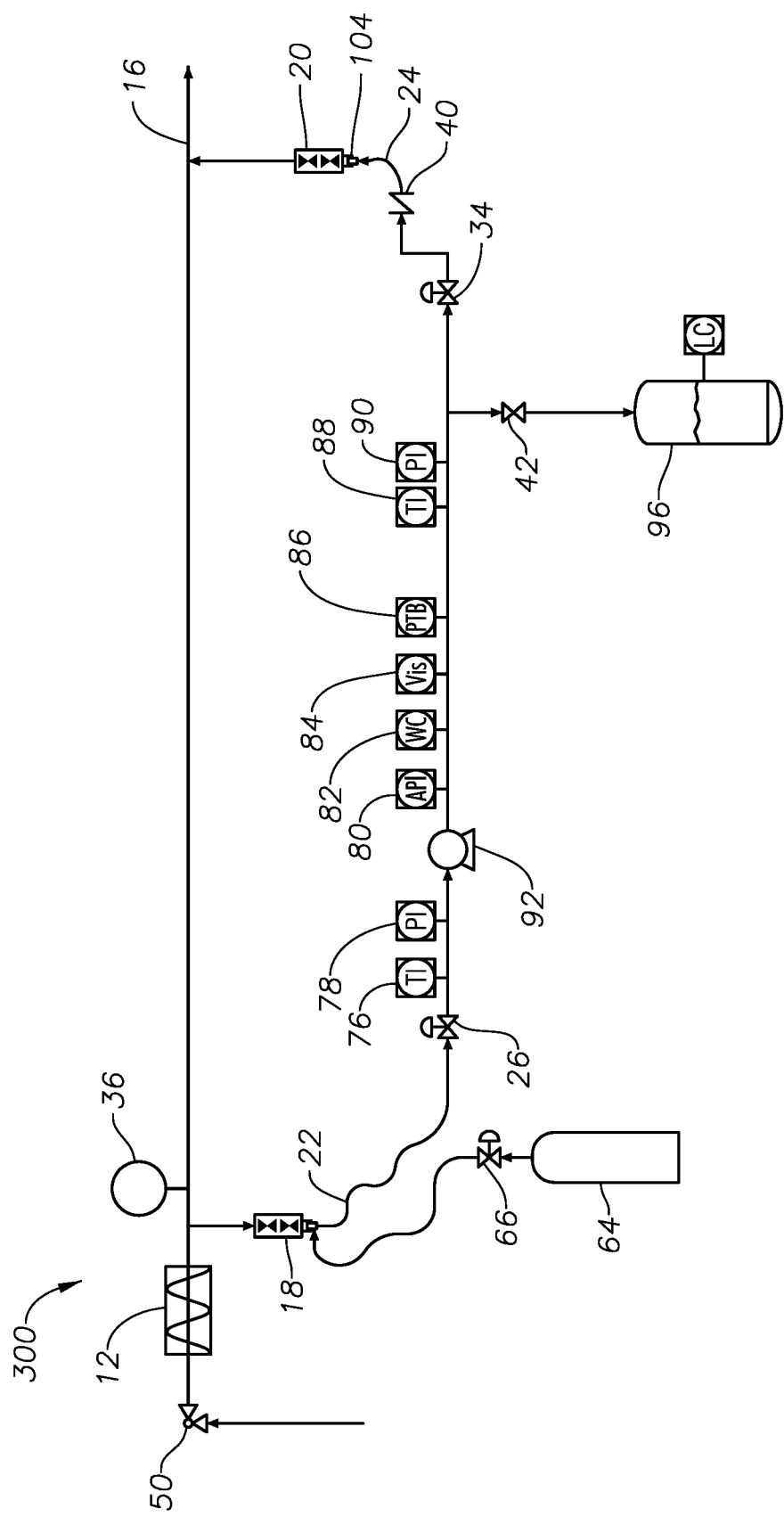
FIG. 11 illustrates a fluid sampling device and a fluid sampling method, according to another example embodiment of the disclosure.

FIG. 11 illustrates a fluid sampling device 300 and a fluid sampling method, according to another example embodiment of the disclosure. Device 300 includes a mobile sampling station configured to collect pressurized sample using only nitrogen and no compressors, in a pressurized sample container 96. The objective of this configuration is to simplify the sampling process for collecting samples downstream choke valve 50 where most of the gas is released from the crude and the need for either to conduct sampling online or to collect pressurized samples. This embodiment enables conducting the sampling onsite and minimizing the need to collect samples and transfer it to the lab for additional analysis. A pump is immediately used to increase the pressure of the crude and maintain it in liquid form, and to avoid two phases. Nitrogen tank 64 is utilized to purge the apparatus after sampling is complete.

Figure 12:
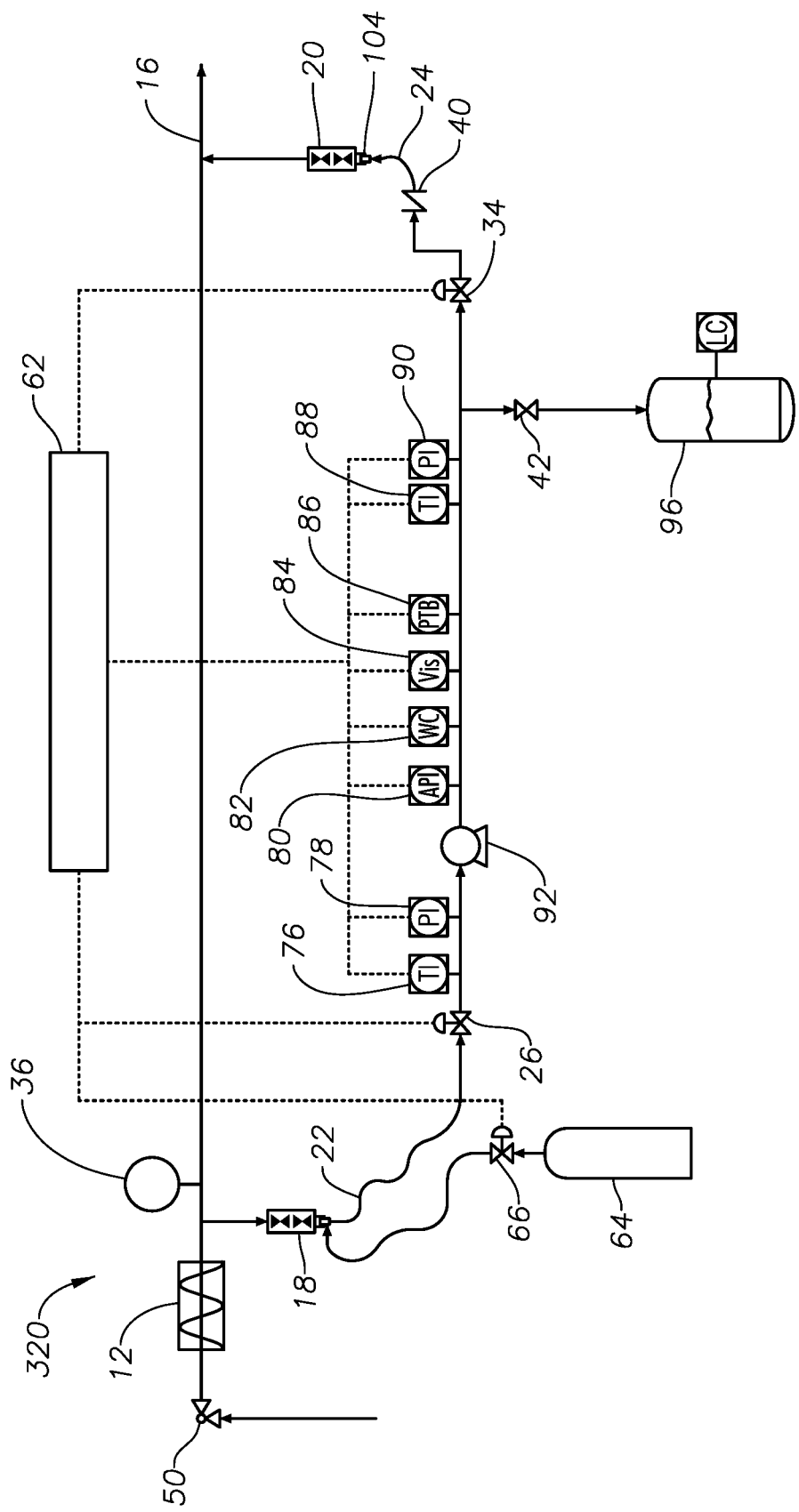
FIG. 12 illustrates a fluid sampling device and a fluid sampling method, according to another example embodiment of the disclosure.

FIG. 12 illustrates a fluid sampling device 320 and a fluid sampling method, according to another example embodiment of the disclosure. Device 320 includes an advanced process control unit 62 is utilized to automate the sampling collection and analysis to minimize human interaction and exposure to toxic gases during the sampling process. The automatic sampling process will start after the manual connection of the hoses 22, 24 via quick acting and leakage free couplings 102, 104 and the opening of valves 18, 20.

Another example embodiment is a method for sampling a fluid. The method includes providing an inlet to receive a portion of a non-homogeneous fluid flowing through a conduit, coupling a first double block bleed valve to the inlet, coupling a first flexible hose to the first double block bleed valve by a first quick acting and leakage free coupling, coupling a collection drum to the first flexible hose by a first control valve, coupling a container to the connection drum by a manual valve, and collecting a fluid sample in the container. The method may also include providing a pressure controller to control pressure within the collection drum, and providing a level indicator to indicate a level of fluid in the collection drum. The method may also include coupling a battery operated positive displacement compressor or booster pump to the collection drum, coupling a second flexible hose to the compressor by a non-return valve, and coupling a second double block bleed valve to the conduit, wherein the second flexile hose is coupled to the second double block bleed valve by a second quick acting and leakage free coupling.

The method may also include coupling a pressure differential valve to the conduit, providing a first pressure transducer configured to measure pressure of the fluid before entering the pressure differential valve, and providing a second pressure transducer configured to measure pressure of the fluid after exiting the pressure differential valve. The non-homogeneous fluid may include a three-phase stream including water, oil, and gas. The fluid may also include toxic materials or hazardous products, and the method is configured to eliminate release of toxic waste into the atmosphere. The battery operated positive displacement compressor may be configured to return waste back to the fluid stream after sampling.

The method may also include analyzing the fluid sample collected, and the analysis may include at least one of water cut measurement, viscosity measurement, density measurement, salt measurement, and assessing the composition of the fluid sample collected. The method may further include coupling a control unit to all the valves and the compressor, the control unit configured to control collection of the fluid sample in the container. The method may also include coupling a nitrogen tank to the first double block bleed valve by a control valve. The method may further include coupling at least one of a temperature sensor, a pressure sensor, a density meter, a water cut meter, a viscosity meter, and a salt analyzer, to the control unit. The method may also include coupling a liquid pump and ejector to the collection drum, the liquid pump and ejector configured to pump the fluid back to the conduit.

Computer Readable Medium

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "operatively connecting" and its conjugated forms means to complete any type of required junction, including electrical, mechanical or fluid, to form a connection between two or more previously non-joined objects. If a first component is operatively connected to a second component, the connection can occur either directly or through a common connector. "Optionally" and its various forms means that the subsequently described event or circumstance may or may not occur. The description includes instances where the event or circumstance occurs and instances where it does not occur.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A fluid sampling device comprising:
   an inlet configured to receive a portion of a non-homogeneous fluid flowing through a conduit;
   a first double block bleed valve coupled to the inlet;
   a first flexible hose coupled to the first double block bleed valve by a first quick acting and leakage free coupling;
   a collection drum coupled to the first flexible hose by a first control valve;
   a battery operated positive displacement compressor coupled to the collection drum;

a second flexible hose coupled to the compressor by a non-return valve and coupled to a second double block bleed valve by a second quick acting and leakage free coupling;

the second double block bleed valve coupled to the conduit; and a container coupled to the collection drum by a manual valve, wherein the device is configured to collect a fluid sample in the container.

2. The device of claim 1, further comprising:
a pressure controller to control pressure within the collection drum; and
a level indicator to indicate a level of fluid in the collection drum.

3. The device of claim 1, further comprising:
a pressure differential valve coupled to the conduit;
a first pressure transducer configured to measure pressure of the fluid before entering the pressure differential valve; and
a second pressure transducer configured to measure pressure of the fluid after exiting the pressure differential valve.

4. The device of claim 1, wherein the non-homogeneous fluid comprises a three-phase stream including water, oil, and gas.

5. The device of claim 4, wherein the fluid further comprises toxic materials or hazardous products.

6. The device of claim 1, wherein the device is configured to eliminate release of toxic waste into the atmosphere.

7. The device of claim 1, wherein the battery operated positive displacement compressor is configured to return waste back to the fluid stream after sampling.

8. The device of claim 1, further comprising: one or more processors configured to execute computer readable instructions to analyze the fluid sample collected.

9. The device of claim 8, further comprising: a transceiver coupled to the one or more processors, the transceiver configured to connect the one or more processors to a cloud computing device.

10. The device of claim 1, further comprising:
a control unit operatively coupled to all the valves in the device and the compressor, the control unit configured to control collection of the fluid sample in the container.

11. The device of claim 8, wherein the analysis comprises at least one of water cut measurement, viscosity measurement, density measurement, salt measurement, and assessing the composition of the fluid sample collected.

12. The device of claim 1, further comprising:
a nitrogen tank coupled to the first double block bleed valve by a control valve.

13. The device of claim 1, further comprising at least one of a temperature sensor, a pressure sensor, a density meter, a water cut meter, a viscosity meter, and a salt analyzer, coupled to a control unit.

14. The device of claim 1, wherein the device is self-contained and portable.

15. The device of claim 1, further comprising a liquid pump and ejector coupled to the collection drum, the liquid pump configured to selectively pump liquid from the collection drum to the ejector, and the ejector configured to combine gas from the collection drum with liquid discharged from the pump to increase pressure of the gas for returning the gas and the liquid back to the conduit.

16. A method for sampling a fluid, the method comprising:
providing an inlet to receive a portion of a non-homogeneous fluid flowing through a conduit;
coupling a first double block bleed valve to the inlet;
coupling a first flexible hose to the first double block bleed valve by a first quick acting and leakage free coupling;
coupling a collection drum to the first flexible hose by a first control valve;
coupling a container to the collection drum by a manual valve;
coupling a battery operated positive displacement compressor to the collection drum;
coupling a second flexible hose to the compressor by a non-return valve;
coupling the second flexible hose to a second double block bleed valve by a second quick acting and leakage free coupling;
coupling the second double block bleed valve to the conduit; and
collecting a fluid sample in the container.

17. The method of claim 16, further comprising:
providing a pressure controller to control pressure within the collection drum; and
providing a level indicator to indicate a level of fluid in the collection drum.

18. The method of claim 16, further comprising:
operating the compressor so that pressure in the collection drum reaches 0 psig.

19. The method of claim 16, further comprising:
coupling a pressure differential valve to the conduit;
providing a first pressure transducer configured to measure pressure of the fluid before entering the pressure differential valve; and
providing a second pressure transducer configured to measure pressure of the fluid after exiting the pressure differential valve.

20. The method of claim 16, wherein the non-homogeneous fluid comprises a three-phase stream including water, oil, and gas.

21. The method of claim 20, wherein the fluid further comprises toxic materials or hazardous products.

22. The method of claim 16, wherein the method is configured to eliminate release of toxic waste into the atmosphere.

23. The method of claim 16, wherein the battery operated positive displacement compressor is configured to return waste back to the fluid stream after sampling.

24. The method of claim 16, further comprising: analyzing the fluid sample collected.

25. The method of claim 18, further comprising:
coupling a control unit to all the valves and the compressor, the control unit configured to control collection of the fluid sample in the container.

26. The method of claim 24, wherein the analysis comprises at least one of water cut measurement, viscosity measurement, density measurement, salt measurement, and assessing the composition of the fluid sample collected.

27. The method of claim 16, further comprising:
coupling a nitrogen tank to the first double block bleed valve by a control valve and
pressurizing the collection drum with nitrogen from the nitrogen tank.

28. The method of claim 16, further comprising:
coupling at least one of a temperature sensor, a pressure sensor, a density meter, a water cut meter, a viscosity meter, and a salt analyzer, to a control unit.

29. The method of claim 16, further comprising:
coupling a liquid pump and ejector to the collection drum, the liquid pump and ejector configured to pump the fluid back to the conduit.

* * * * *